R. M. SMITH.
CENTRIFUGAL EXTRACTOR.
APPLICATION FILED AUG. 21, 1916.
1,275,486.
Patented Aug. 13, 1918.
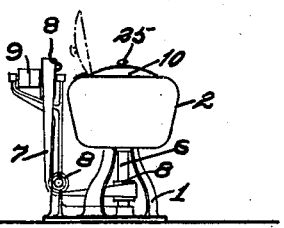
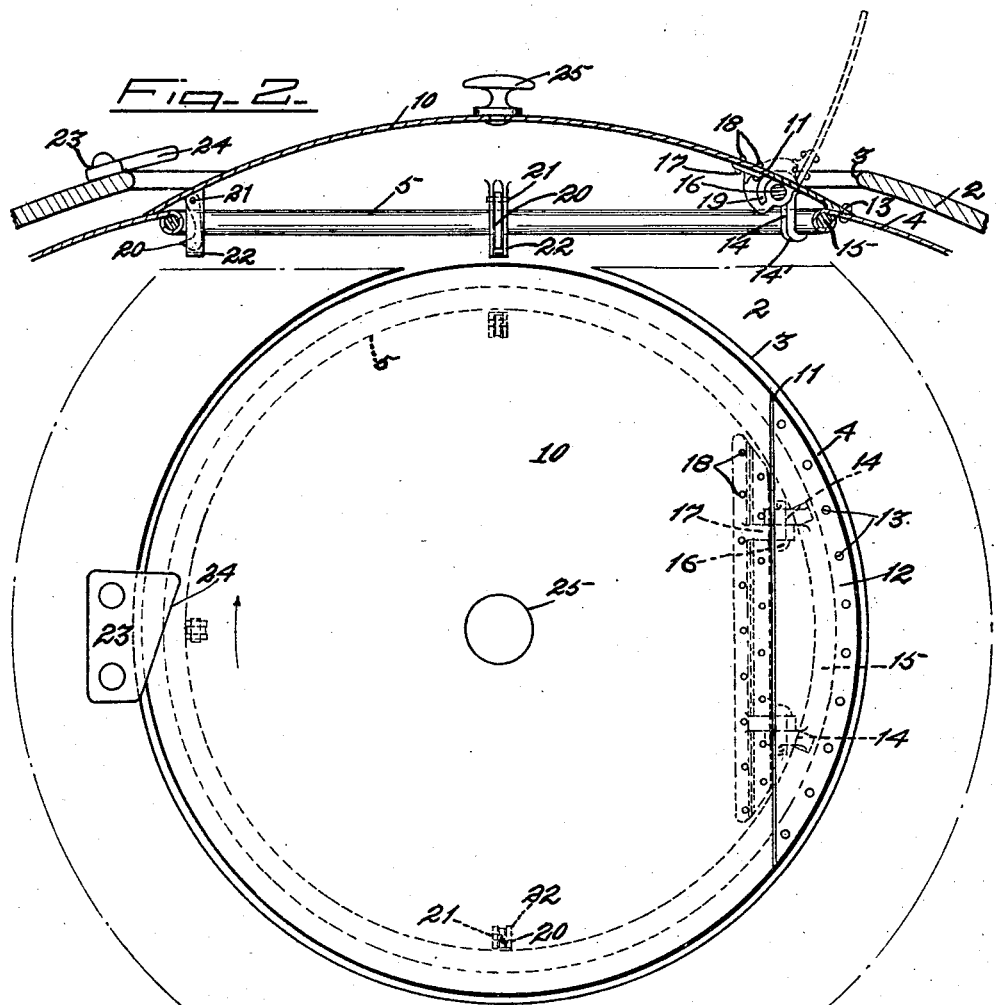
WITNESS
INVENTOR.
Robert M. Smith
BY
ATTORNEYS

UNITED STATES PATENT OFFICE.

ROBERT M. SMITH, OF SAN FRANCISCO, CALIFORNIA.

CENTRIFUGAL EXTRACTOR.

1,275,486.   Specification of Letters Patent.   Patented Aug. 13, 1918.

Application filed August 21, 1916. Serial No. 115,968.

*To all whom it may concern:*

Be it known that I, ROBERT M. SMITH, a citizen of the United States, residing at the city and county of San Francisco and State of California, have invented certain new and useful Improvements in Centrifugal Extractors, of which the following is a specification.

The present invention relates to centrifugal extractors and more particularly to a cover for the baskets of centrifugal extractors, particularly that type adapted for laundries, and by the use of which the operators are prevented from disturbing the contents of the basket after the same is in operation; one wherein the cover is automatically maintained, locked in closed position during the rotation of the centrifugal, one provided with means for automatically closing the cover onto the basket at the starting or commencement of the rotation thereof; and one whereby the operators are protected from injury, due to carelessness in examining the contents of the basket while the same is in operation.

The invention consists broadly in a cover for closing the open top of the rotary basket of a centrifugal extractor and which is required to be in a position to close the open top of the basket at the commencement of the rotation of the same.

At present, covers are provided for closing the centrifugal, but the same are perforated and are secured to the curb of the apparatus, it being optional with the attendant whether the cover is closed prior to the operation of the basket or not, and in this construction the operator is liable to injury due to neglecting to close the cover, and whether or not the cover is raised or lowered, a suitable cover preferably of cloth, is required to be positioned in the basket over the contents thereof, to exclude therefrom the dust in the atmosphere which is drawn into the basket by the suction created by the high rotation thereof.

It will be apparent that the present invention protects the operator from injury by preventing access to the contents of the basket after the rotation thereof has commenced, until such time as the basket is again at rest and in a certain position.

With the above mentioned and other objects in view, the invention consists in the novel construction and combination of parts hereinafter described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

To more fully comprehend the invention, reference is directed to the accompanying drawings wherein:

Figure 1 is a view in elevation of an extractor with an embodiment of my invention applied thereto.

Fig. 2 is an enlarged, broken sectional view of an extractor, illustrating my improved cover hinged to close the open top of the basket thereof, and the automatically controlled cover-locking means, and the means for closing the cover and for preventing the opening of the same until the basket is at a point of rest and in a certain position.

Fig. 3 is a view in detail plan of the construction disclosed in Fig. 2.

Referring more particularly to the several views of the drawings wherein like characters of reference designate corresponding parts, 1 indicates a suitable base for supporting a suitable extractor curb 2, opened at its top as at 3. A basket 4 of any well known type, open at its top as at 5, is rotatably mounted within the curb 2 on a shaft 6, rotated at high speed in any suitable manner as by the belt 7 passing around the pulleys 8 and driven by power transmitted to one of the pulleys 9.

A suitable imperforate cover 10 is provided for closing the opening 5 in the basket, and the same is preferably of a size to extend beyond the peripheral edges of the opening, to rest on the main body portion of the basket, but of a size smaller than the opening 3 in the curb 2. The cover is cut preferably on a line 11 providing a portion or segment 12 which is adapted for securing to the basket 4, in any suitable manner, as by the rivets 13. The portion 12 carries the hinge members 14, which are hooked at their lower ends as at 14′ to engage the rolled edge 15, arranged circumferentially of the opening 5 in the basket 4. Pivotally connected to the hinge members 14 through the pintles 16 are coöperating hinge portions 17, secured in any suitable manner as by rivets 18, to the main portion of the cover 10 adjacent the line 11. The shanks of said hinge portions 17 are preferably bent to provide the slots 19, which receive the edge of the portion 12, and permit the cover when open to assume the position as illustrated in dotted lines, Figs. 1 and 2 of the drawings.

To insure the locking of the cover in position during the rotation of the basket, suitable catches 20 are pivoted at the upper ends as at 21, within the guides or brackets 22 depending from the underside of the cover adjacent the peripheral edge thereof, and the free hooked ends of said catches are adapted to swing outwardly and engage under the rolled edge 15 on the rotation of the basket 4. The basket on coming to a point of rest permits the catches 20 to assume the position as in Fig. 2, at which time the cover may be raised and lowered.

To insure the closing of the cover 10 at the commencement of the rotation of the basket 4, a suitable lug 23 is secured to the curb 2 to overhang the open top thereof, and said lug is provided with a surface beveled as at 24 in the direction of the rotation of the basket as in Fig. 3. To raise the cover when the basket is at a point of rest, it is necessary that the portion 12 of the cover, lie beneath the lug 23, this positioning permitting the raising of the free edge of the cover. For safety the cover 10 should be closed prior to the rotating of the basket, but should the same remain raised, due to the negligence of the operator, and the basket be rotated, the engagement of the beveled surface 24 of the lug 23 with the edge of the raised cover will throw the same in the closed position, prior to the basket making a complete revolution.

To facilitate the raising of the cover, a suitable handle 25 is provided for this purpose.

Having thus described my invention, what I claim is:

1. In combination with a centrifugal extractor having a stationary open topped curb and an open topped basket rotatably mounted therein, a removable cover hinged at one side to said basket and for insertion through the opening in said curb and for seating upon said basket for closing the open top thereof and means for coöperating with the cover to close the same during the rotation of said basket.

2. In combination with a centrifugal extractor having a stationary open topped curb and an open topped basket rotatably mounted therein, a cover for closing the open top of said basket and hinged at one side thereto, weight controlled means for locking the cover in closed position during the rotation of said basket, said means automatically releasing on the basket arriving at a point of rest and means for insuring the closing of the cover prior to the rotation of the basket.

3. In combination with a centrifugal extractor having a stationary open topped curb and an open topped basket rotatably mounted therein, a cover for closing the open top of said basket and hinged at one side thereto, and means for automatically moving said cover to close the open top of said basket at the beginning of the rotary movement of said basket.

4. In combination with a centrifugal extractor having a stationary open topped curb and an open topped basket rotatably mounted therein, a cover for closing the open top of said basket and hinged at one side thereto and capable of rising through the opening in said curb, and means carried by the curb for contacting with the raised cover to move the same to close the open top of said basket during the rotation thereof.

5. In combination with a centrifugal extractor having a stationary open topped curb and an open topped basket rotatably mounted therein, a cover for closing the open top of said basket and hinged at one side thereto, and capable of rising through the opening in said curb, means for automatically moving the cover when raised to close the open top of said basket during the rotation thereof, and means for automatically locking the cover in closed position during the rotation of said basket.

6. In combination with a centrifugal extractor having a stationary open topped curb and an open topped basket rotatably mounted therein, a cover for closing the open top of said basket and hinged at one side thereto, and capable of rising through the opening in said curb, means for moving the cover when raised to close the open top of said basket during the rotation thereof, and means for locking the cover in closed position.

In testimony whereof I have signed my name to this specification in the presence of two subscribing witnesses.

ROBERT M. SMITH.

Witnesses:
H. C. SMITH,
D. B. RICHARDS.

Copies of this patent may be obtained for five cents each, by addressing the "Commissioner of Patents, Washington, D. C."